Nov. 1, 1932.  L. N. HAMPTON  1,885,714
SIGNAL FOR VEHICLES
Filed Jan. 7, 1928   2 Sheets-Sheet 1
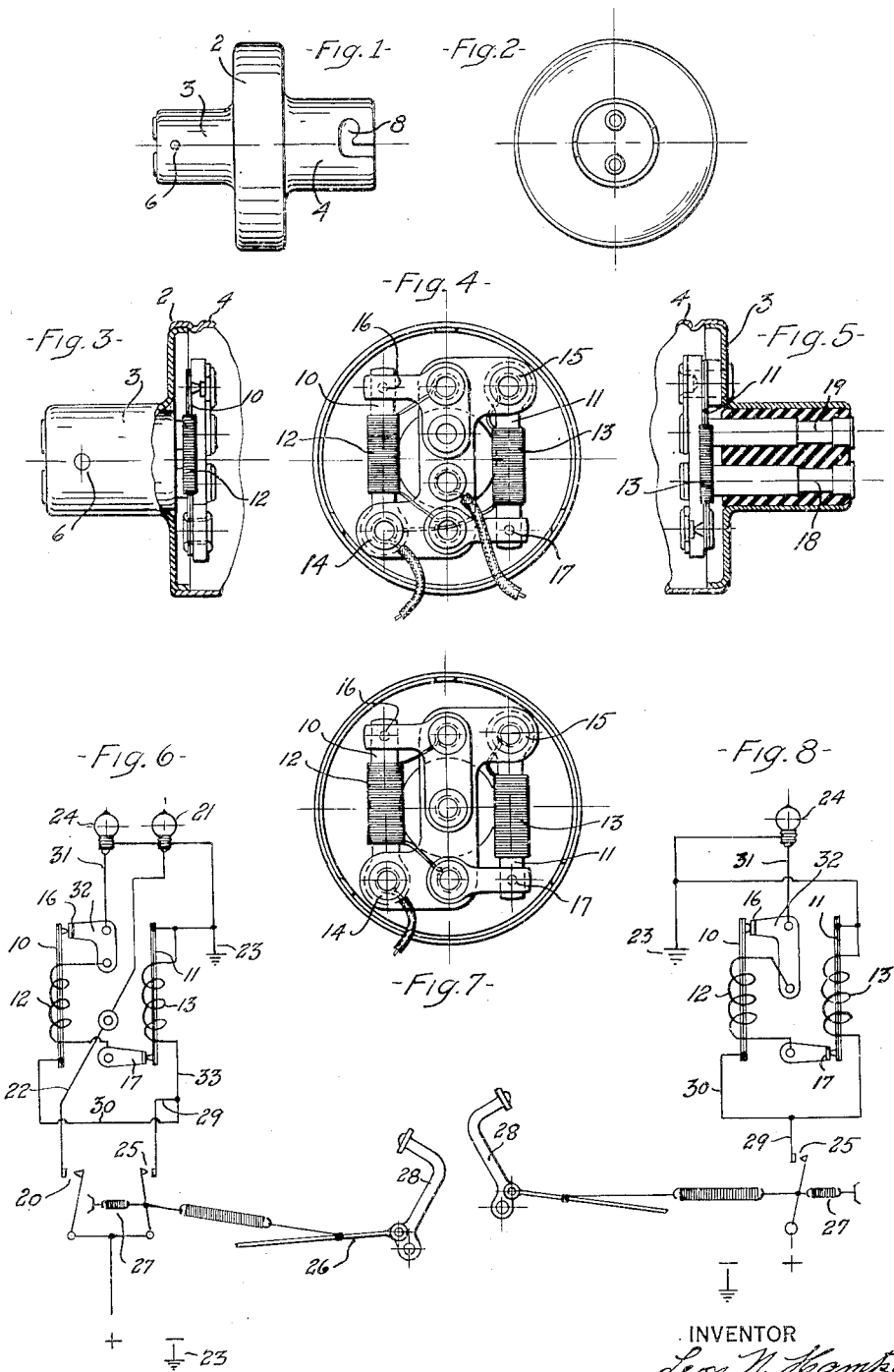
INVENTOR
Leon N. Hampton
BY
Riddle and Margeson
ATTORNEYS.

Nov. 1, 1932.  L. N. HAMPTON  1,885,714
SIGNAL FOR VEHICLES
Filed Jan. 7, 1928  2 Sheets-Sheet 2
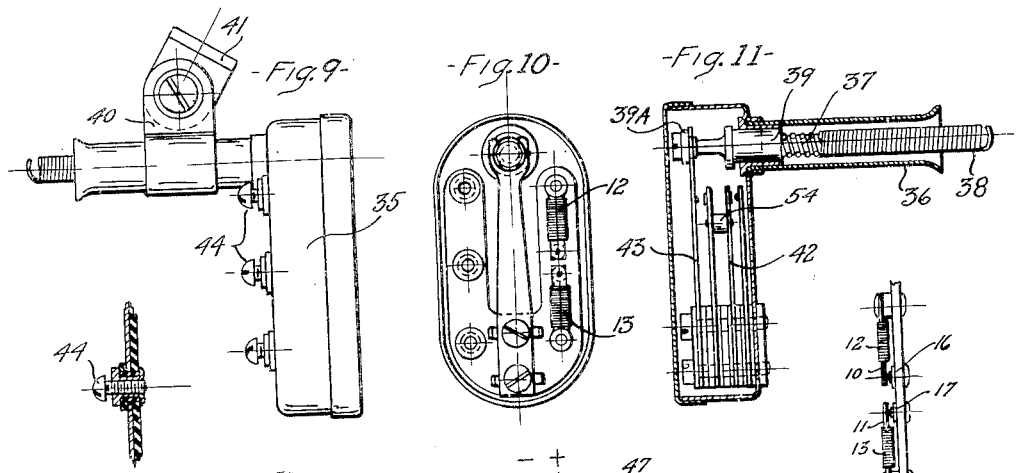
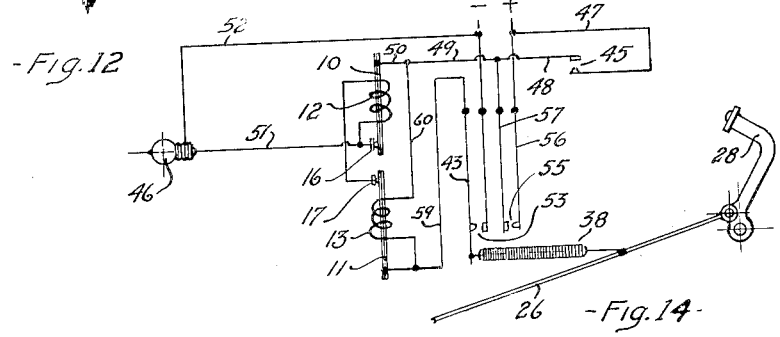
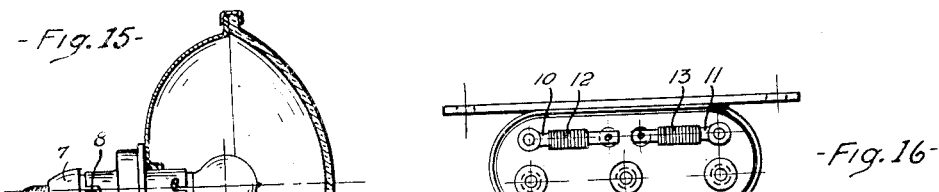
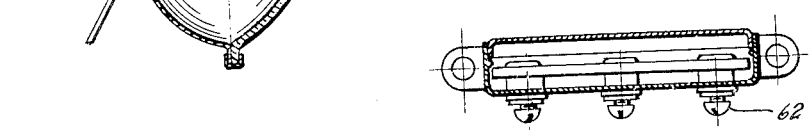
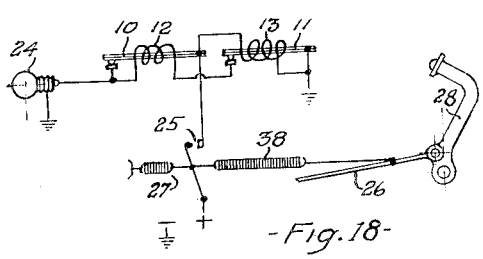
INVENTOR
BY Leon N. Hampton
Kiddle and Margeson
ATTORNEYS.

Patented Nov. 1, 1932

1,885,714

UNITED STATES PATENT OFFICE

LEON N. HAMPTON, OF NEW YORK, N. Y.

SIGNAL FOR VEHICLES

Application filed January 7, 1928. Serial No. 245,069.

The present invention relates to the provision of a new and improved signal apparatus for vehicles, the same having been designed primarily for use on motor vehicles.

One of the objects of my invention is the provision of a signal apparatus which will increase the safety features of such signals as compared with those now in almost universal use.

It is customary in the motor vehicle industry today to apply so-called stop signals to the rear end of the vehicle, either as standard equipment or by way of an attachment, these signals being operated by depression of the brake or the clutch pedal, usually the former.

Such devices usually consist of a lamp or other signal device in some convenient location at the rear end of the vehicle, the circuit to this signal device being closed by operation of the brake pedal or clutch pedal as the case may be to which a contact in the circuit of the signal device is attached. However, such devices are not entirely satisfactory as a warning signal for the reason that, in addition thereto motor vehicles are required by law to be provided with a tail light which remains lighted at all times while night driving and the stop signal is usually located adjacent the tail light, so that when driving at night in heavy traffic, the lighting of the stop signal may not be noticed, being merely one more light within the driver's vision.

To overcome the likelihood of the stop signal being unnoticed, the present invention provides a signal apparatus employing a lamp or other signal device which initially is intermittently operated, momentarily, so that the attention of a following driver will be attracted thereto even though he may not be viewing it directly. The intermittent operation is only a matter of a few seconds, and thereafter the signal will operate continuously so long as the brake pedal or clutch pedal remains depressed. I am aware that this idea broadly is not new with me, but all such devices so far devised, so far as I know to the contrary consist of a relatively large number of moving parts which are not only expensive to manufacture and assemble so that the cost of a complete device might be prohibitive but are unsatisfactory and uncertain in operation, a dangerous condition where safety is of prime importance.

In the present invention I have overcome the defects inherent in prior devices in that I have provided an apparatus in which no moving parts are necessary or employed unless a contact spring might be considered a moving part. At any rate the moving parts are kept at a minimum. Consequently there is nothing to break or jar out of position thereby destroying the operativeness of the device, nor is the human element relied upon for its operation except in depressing a brake pedal for example which is imperative under conditions requiring the signal.

The present apparatus possesses many other advantages over prior devices in that the same may be installed with the minimum of expense as standard equipment on a motor vehicle, or may be sold as an attachment adapted to be placed in operative position on a vehicle in a few seconds by the mere placement of a plug, or the same may be sold as an attachment adapted to be placed by a car owner beneath the floor board of the car or in other convenient location.

In all forms, however, my improved apparatus is of such a character that moving parts are kept at a minimum and when the signal is set in operation the same will operate intermittently initially for a few seconds, the length of time during which this intermittent operation continues depending upon the design, the apparatus finally operating as a steady signal as long as the brake pedal for example remains depressed.

My device lends itself to ready incorporation in existing stop signals of the type wherein the stop light and tail light are separate devices and of the type in which the stop light and tail light are embodied in the one device. My improved apparatus also may be incorporated directly in the circuit of the tail light if desired, so that no additional stop light is needed, such arrangement providing for intermittent operation of the tail light momentarily when the brake pedal is depressed. In this connection I may say that I have so constructed my device as to make it unnecessary to operate the tail light in daylight driving except as a stop signal, while at night the tail light burns as usual excepting when utilizing the same as a stop signal.

In the accompanying drawings,

Fig. 1 is a view in elevation of one embodiment of my invention adapted for use as an attachment for so-called combination tail and stop lights;

Fig. 2 is a view similar to Fig. 1 taken at right angles thereto;

Fig. 3 is a view in part section of a portion of the device of Fig. 1, showing the internal construction thereof;

Fig. 4 is an end view of the device of Fig. 3;

Fig. 5 is a view in sectional elevation of the device of Fig. 3 showing the internal construction thereof in more detail;

Fig. 6 is a wiring diagram suitable for operation of the device of Fig. 1;

Fig. 7 is a view similar to Fig. 4 showing my improved apparatus as the same is preferably constructed when to be employed as a stop signal only as distinguished from use in a combination tail and stop signal;

Fig. 8 is a wiring diagram suitable for operation of the device of Fig. 7;

Fig. 9 is an elevational view showing another embodiment of my invention adapted primarily for standard equipment; by virtue of the fact that the stop light switch and signal control are combined in an attractive manufacturing unit;

Fig. 10 is an internal view of Fig. 9;

Fig. 11 is a section through Fig. 9;

Figs. 12 and 13 are detail views of parts of the apparatus of Figs. 9, 10 and 11;

Fig. 14 is a wiring diagram suitable for operation of the apparatus of Fig. 9; when used as a combination signal and stop light;

Fig. 15 shows my invention as installed in a stop light structure;

Figs. 16 and 17 show a still further embodiment of my invention; wherein the device may be inserted in series so to speak with existing stop light wires; while Fig. 18 is a wiring diagram suitable therefor.

Referring to the drawings in detail and first of all to Figs. 1 to 6 inclusive: This embodiment of my invention as mentioned above is intended primarily for use in so-called combination tail and stop lights, and consists of a plug 2 which commercially might comprise two telescoped parts 3 and 4, the part 3 being insertable for example in the conventional socket of an existing fixture which might be a combination tail and stop light, being held in place therein by a pin 6 as will be understood.

For the sake of clarity I might say at this point that in stop lights and tail lights as now constructed it is customary to employ a plug for attaching the necessary wires to the lighting fixture and such a plug is shown at 7 in Fig. 15.

This plug ordinarily would be plugged into the conventional socket but when my device is to be installed, the plug 7 is removed and the device 2 of Fig. 1 substituted therefor positioning the plug 7 in the end 4 of device 2. The plug 7 is conveniently held in place in the device 2 by a bayonet joint comprising a slot 8 in my device and the usual pin 9 in the plug 7. The device is now ready for operation.

The specific internal structure of the plug 2 is not of primary importance and may be varied widely from the construction shown. However, it essentially comprises temperature controlled or thermal contacts 10 and 11 and coils 12 and 13 respectively. The temperature controlled contact 10 is anchored at one end as indicated at 14, while the contact 11 is also anchored at one end as indicated at 15 where contact 11 is also grounded to the case it being understood that contact 10 is suitably insulated from the case. Each of the contacts 10 and 11 is of thermo metal, a material well known commercially and of such a character as to be deflected by changes in temperature therein. The free end of the contact 10 cooperates with a fixed contact 16 while the free end of the contact 11 cooperate with a fixed contact 17 each of which are also insulated from the case for circuit purposes.

As above stated the device 2 is adapted for use in combination tail and stop lights where only the one plug is employed, and by reason of this fact my device provides two fixed contacts, 18 being the tail light contact while 19 is the stop light or signal contact.

Referring to the wiring diagram of Fig. 6 it will be seen that I have indicated therein the usual tail light switch 20 which it will be understood is closed during night driving, closure of this switch completing the circuit to the tail lamp 21 from the positive side of the source of power such as a storage battery through switch 20, conductor 22, lamp 21 and ground 23 it being understood that the negative side of the battery is also grounded. This is a usual circuit. The stop signal lamp is designated 24 and its operation will now be described. 25 designates a stop light or stop signal switch, one contact of which is suitably and operatively connected to the brake rod 26. 27 designates a resetting spring for holding the switch 25 open except when the pedal 28 is depressed. Assuming that the pedal 28 is depressed at which time, of course, it is desired to energize the signal device 24, it will be seen that a circuit is closed to the signal device from the positive side of the source of power, through switch 25, conductors 29 and 30, thermal contact 10, contact 16, conductor 31, lamp 24 to ground 23, causing the lamp 24 to be lighted immediately. This is very desirable. At the same time a circuit will be closed to the coil 12, which for the sake of clarity I will refer to hereinafter as the flasher coil, which circuit may be traced as follows:—From the positive side of the source of power, through switch 25, conductors 29 and 30, thermal contact 10, contact 16, conducting strip 32, flasher coil 12, contact 17, thermal contact 11 to ground 23. A circuit is also closed at this time to the control coil 13, as follows:—From the positive side of the source of power, through switch 25, conductors 29 and 33, through the control coil 13, to ground 23. The exciting of the flasher coil 12 quickly heats the thermal contact 10 sufficiently to cause the same to open the circuit to the lamp 24 at the contact 16, and the lamp of course will be extinguished. The opening of this circuit, however, is only momentary, inasmuch as the opening of the circuit at the contact 16 not only opens the light circuit but the circuit of the flasher coil as well, with the result that the thermal contact 10 will quickly cool, and again close the circuit of the lamp 24 and flasher coil 12. By this means, therefore, the signal device 24 is caused to be flashed or operated intermittently.

During this flashing period, however, the circuit to the control coil 13 has remained closed, but although this coil heats more slowly than coil 12 eventually it will generate sufficient heat to cause the thermal control contact 11 to move away from its fixed contact 17. The purpose of providing two coils with different temperature characteristics will now be apparent, because a time lag in their operation is necessary for my purpose, and inasmuch as both coils receive current simultaneously the desired lag results from their different temperature characteristics. I wish it to be noted that the same results may be obtained in other ways, as for example by employing different metals in the contacts 10 and 11 different radiating areas, etc. However, I have found the coil arrangement very satisfactory and I believe very practicable from the standpoint of manufacture.

Upon separation of the contacts 11 and 17, the circuit to the flasher coil 12 is opened allowing the thermal flasher contact 10 to close and remain closed or prevent its further opening if it is already closed holding closed the circuit, previously only intermittently closed, of the lamp 24, so that the same will now remain lighted as long as the pedal 28 remains depressed.

Accordingly, in this embodiment of my invention I have provided an apparatus adapted for use in combined tail and stop light installations, wherein the tail light by closure of the usual tail light switch 20 remains lighted as long as desired while the stop light 24 by temperature controlled means is caused, upon depression of the pedal 28, to light or operate intermittently initially, and after the lapse of a few seconds to burn continuously until the pedal is released, whereupon the circuit to the stop light 24 is opened by the automatic opening of the switch 25 through the action of resetting spring 27 as will be understood. It will be seen also that my invention provides for the instantaneous lighting or operation of the device 24 upon depression of a pedal and permits me to accomplish the results desired without the employment of any moving parts in the device itself, such as escapement mechanism, pivotal contact arms etc., which are impracticable commercially and are likely to get out of order very quickly and work very unsatisfactorily at best. It will be seen also that such devices have been eliminated by providing temperature-controlled means which necessitates no moving parts, unless the contacts themselves be considered moving parts and in fact reduces the number of parts to a minimum, thereby insuring at all times proper operation and functioning of the device and at the same time keeping the cost of manufacture and assembly down to the minimum which in the automobile industry is an important item.

In Figs. 7 and 8 I have embodied my invention in a stop light or stop signal only, that is to say, I have eliminated the tail light 21 and the circuit therefor of Fig. 6. The construction of the device as will be seen from Fig. 7 is identical with that of Fig. 4 except for the elimination of the connection for the tail light, the easy attachment feature being retained, as the same may be plugged into an existing fixture just as before. The construction of the attachment itself therefore as illustrated in Fig. 7 will not be gone into in detail, the same reference characters being employed thereon as in Fig. 4, for instance.

Referring to the wiring diagram for the apparatus of Fig. 7, shown in Fig. 8, it will be seen that when the pedal is depressed to close the switch 25 that a circuit will be closed to the stop device, in this instance, the lamp 24, as follows:—From the positive side of the source of power through the switch 25, conductors 29 and 30, thermal flasher contact 10, contact 16, conductor 31 through the lamp 24 to ground 23. It will be seen also that at this time a circuit is closed to the flasher coil 12, this circuit being from the positive side of the source of power through switch 25, conductors 29 and 30, contacts 10 and 16, strip 32, coil 12, contacts 17 and 11 to ground 23, the closing of the circuit to the flasher coil 12 as before causing the thermal flasher contact 10 to effect intermittent operation of the lamp 24 just as explained in connection with the diagram of Fig. 6. It is believed unnecessary to further trace the circuits of this diagram inasmuch as the operation of the same is exactly as already described in Fig. 6, the control coil 13 finally taking the control of the device 24 away from the coil 12 to effect continuous lighting of the lamp 24 until the pedal 28 has been released.

In the apparatus illustrated in Figs. 9 to 14 inclusive, as above briefly noted, I have illustrated an embodiment of my invention adapted for standard equipment on a motor vehicle as distinguished from the two forms of my invention above described which may be applied by a car owner. For purposes of illustration the apparatus of Figs. 9 to 14 is shown as a combination tail and stop light installation, that is to say, an installation in which the one signal device functions normally as a tail light, but when desired, however, as a stop light. I wish it to be understood that this embodiment of my invention can be readily changed over to a stop light only or to an installation such as that described in connection with Fig. 1.

This embodiment of my invention comprises a box casing 35 having secured thereto and projecting from the side thereof, a sleeve 36 through which passes a control member 37 in the form of a spring 38 and sleeve 39, the inner end of the latter projecting into the interior of the casing 35 and the outer end being threaded into the spring 38. The sleeve 36 is provided with a clamp 40 to which is attached a bracket 41 by which the device may be readily attached to a car body in any convenient position. Within the casing or box 35 are a series of contact leaves 42 one of these leaves designated 43 being attached to the inner end of the sleeve 39 but preferably insulated therefrom by the bushing 39a as shown clearly in Fig. 11, and illustrated diagrammatically in Fig. 14 from which latter figure it will be seen that the contact leaf 43 is attached through the spring 38 above mentioned to the pedal 28. The casing 35 is also provided interiorly with the flasher coil 12 and control coil 13 these coils being provided upon the flasher contact 10 and control contact 11, respectively, just as in the embodiment of my invention illustrated in Fig. 4 for instance. The various connections for attaching the necessary wires to this device from a source of power are illustrated at 44 in Fig. 9 and in Fig. 12 from which latter figure it will be seen that the posts 44 are insulated from the metal of the casing 35 although the post for ground connection might of course be mounted directly in the case after commercial practice. The operation of this device is in principle the same as that already described. 45 designates, on the wiring diagram of Fig. 14, the usual tail light switch and for night driving it is merely necessary to close this switch to close a circuit to the tail lamp 46. This circuit may be traced from the positive side of the source of power by way of conductor 47, switch 45, conductors 48, 49 and 50, thermal contact 10, contact 16, conductor 51, lamp 46, conductor 52 to the negative side of the line this being a typical two wire circuit and it being understood that conductor 52 would be dispensed with in a grounded or single conductor circuit grounding one side of the light and the contact 53 instead of leading them to the negative battery by special conductor. As long as the pedal 28 is not depressed and as long as the switch 45 is closed, the tail lamp 46 will operate without interruption. Assuming, however, that the pedal is depressed it will be seen that this will cause the spring leaf control 43 to close on contact 53, likewise, through a block 54, see Fig. 11, contacts 55 will also be closed mechanically. A circuit is now closed to the lamp 46, which circuit, however, does not pass through the tail light switch 45 so that whether this switch is closed or not is of no consequence. This circuit is as follows:—From the positive side of the source of power through leaf 56, contacts 55, leaf 57, conductors 49 and 50, flasher thermal contact 10, contact 16, conductor 51, lamp 46, conductor 52 to the negative side of the line or to ground as the case may be. A circuit is also closed at this time to the flasher coil 12, this circuit being the same as that just traced up to and through the contact 16, from which the current passes through the coil 12, conductor 58, contact 17, control contact 11, conductor 59, leaf 43, contacts 53 to the negative side of the line, or to ground if the system is of the grounded type. The exciting of the coil 12, as hereinbefore explained in connection with the diagram of Fig. 6, for instance, will cause the thermal contact 10 to function to operate the light 46 intermittently for a period of a few seconds until the control coil 13, the circuit to which at this time is also closed opens the circuit of the flasher coil 12 after which the lamp will burn continuously as long as the pedal 28 remains depressed. For the sake of a clear understanding of this diagram, the circuit for the control coil 13 may be traced from the positive side of the source of power through leaf 56, contacts 55, leaf 57, conductors 49 and 60, coil 13, conductor 59, leaf 43, contacts 53 to the negative side of the line or to ground.

In this embodiment of my invention, therefore, I provide a device adapted to be employed as standard equipment on a motor vehicle in which, if desired, the tail light may be used as a stop light, the device being so constructed and arranged that the tail light may burn by night in the usual way, except when operating as a stop signal, while in daylight driving the light may remain extinguished except at such times when the same is to be used as a stop signal. If this embodiment is used as a signal only then the conductor 59 might readily be connected directly either to the negative source of supply or to ground dispensing with contacts 53 making operable fastening to the device at leaf 57 instead of 43, the contacts 55 then becoming the conventional stop signal switch as switch 25 in Figs. 6, 8 and 18, but distinguished from these in that the switch and signal flasher and control means are combined into one unit.

In Figs. 16, 17 and 18 I show still another embodiment of my invention in the form of a small attachment capable of being inserted in the circuit of an ordinary stop light and attached to the floor boards for example. This is a small, compact and inexpensive device, adapted to be sold as an accessory and by reason of its simplicity it may be sold at a lower price, for example, than the device in Fig. 1, and for such reason may be preferred by some car owners. This device embodies a small casing designated 61 adapted to be attached by screws or other convenient means to the floor board or other suitable part of an automobile. Within the casing 61 I provide a flasher thermal contact 10 and flasher coil 12, as well as the control thermal contact 11 and control coil 13. Suitable connections are provided at the exterior of the casing as indicated at 62 for making the necessary wire connections. The circuit is the same as that described in connection with Fig. 8 and for clarity has been illustrated in Fig. 18, therefore it is believed unecessary to trace the circuit of this diagram the same reference characters having been employed thereon as were used in Fig. 8.

From the foregoing it will be seen therefore that I have provided a signal device for vehicles which is temperature controlled and automatic in operation so far as changing from intermittent to constant operation is concerned, thereby eliminating the use of expensive and generally unsatisfactory small movable parts which have heretofore been suggested in devices of this character. It will be seen also that the invention may take different forms for different purposes in that the same may be built up as a plug adapted to be inserted in the fixture found on any stop light so as to require but a moment for application to convert a stop light or a combined stop and tail light from a steady or constant light to an intermittent and then steady light or signal. It will be seen also that the invention may take a form which adapts it particularly for use as standard equipment while still another form is one in which the same may be inserted between the usual signal switch employed in stop lights and the stop light itself as for example, beneath the floor of a car. The device in a modification essentially as shown in Fig. 1, might also be built directly into the signal as shown in Fig. 15 the light plugging into the end designated 4 and the conventional connection cord into the end designated 3, making such alterations as would be necessary to change this end from a plug to a socket connection. The control might be built into the circuit in many other ways which will suggest themselves to those skilled in this art.

What I claim is:—

1. A vehicle signal comprising in combination a main switch, a heat-responsive bar, a contact adapted to be engaged by said bar, a lamp, said main switch, heat-responsive bar, contact and lamp being connected in series, a heater coil for said heat-responsive bar for deflecting the bar out of engagement with said contact, a second heat-responsive bar, a contact adapted to be engaged thereby, said main switch, the first-mentioned heat responsive bar, the contact engaged thereby, said heater coil, the contact engaged by the second heat responsive bar and the second bar being connected in series with each other and in shunt with said lamp, a heater coil for the second heat-responsive bar for deflecting the second bar out of contact with its cooperating contact, said second heater coil being connected in series with said main switch and in shunt with said heat-responsive bar switches and said lamp, deflection of the second-mentioned heat-responsive bar being slower than deflection of the first-mentioned bar, so that during one period of operation, with the main switch closed, the circuit of said lamp will be opened and closed intermittently and during another period said circuit will be maintained closed.

2. A vehicle signal comprising in combination an electric lamp and the circuit therefor, a thermal bar switch in series with said lamp with the fixed contact of said switch connected to the lamp, a heater coil connected to the fixed contact of said switch and said circuit so as to be in series with said bar when the contacts are closed and in shunt to said lamp to effect deflection of the said bar, a second thermal bar switch in series with said heater coil, both of said switches being normally closed, and a heater coil for the second thermal switch in shunt to said first-mentioned bar switch, the heater coil therefor, the second bar switch and the lamp, the second-mentioned heater coil requiring a longer time to effect deflection of its bar than the first-mentioned heater coil, the first-mentioned bar switch and heater coil effecting intermittent operation of the lamp until the later deflection of the second bar by the second heater coil.

3. In a device for mounting between a source of electrical energy and a signal lamp and comprising in combination a thermal switch in series with said lamp with the fixed contact of said switch connected to the lamp, a heater coil for said switch connected to the fixed contact of said switch and the circuit of said lamp so as to be in series with the heat responsive bar of said switch when the switch is closed and in shunt to said lamp, a thermal control switch in series with said coil and in shunt with the lamp, both of said switches being normally closed, a heater coil for said last-mentioned switch in shunt to both of said switches, the first-mentioned heater coil and said lamp, the last-mentioned thermal switch being slower in operation than the first-mentioned thermal switch so that the operation of said lamp is initially intermittent due to the action of the first-mentioned thermal switch and its heater coil and continuous upon the later heating of the second-mentioned heater coil.

4. In a device of the class described the combination of a flasher heat responsive conductor bar, a contact carried thereby, a fixed contact engaged thereby, said contacts being normally closed, a heater coil for said bar connected to said fixed contact so as to be in series with said bar when the contacts are closed, a control heat responsive conductor bar and a contact carried thereby, a fixed contact engaged by the contact carried by the control bar, said contacts being normally closed, the fixed contact being connected to said first-mentioned heater coil, a heater coil for the control bar and in shunt to both of said heat-responsive conductor bars, the control bar being slower in deflection than the flasher bar, a grounded support for said heat responsive bar and said fixed contacts, means for affixing the end of each bar opposite its contact to its respective support, the control bar being grounded on its support, and the flasher bar and the fixed contacts being insulated from their supports.

5. A vehicle signal comprising in combination a lamp and circuit therefor, a heat responsive switch comprising a heat-responsive bar, a fixed contact engaged thereby and a heater coil for the bar mounted on the bar and connected to the fixed contact for controlling the circuit of said lamp, said bar being an electric conductor and connected in series with the lamp with the fixed contact connected to the lamp, a second heat responsive switch comprising a heat-responsive bar and a fixed contact engaged by the said bar connected in shunt with said lamp and in series with said heater coil, and a heater coil for the second bar mounted thereon and connected in shunt to said bars, the first-mentioned coil and said lamp, both of said heat-responsive switches being normally closed, the second bar being slower in deflection than the first-mentioned bar initially to permit the first-mentioned switch to function to effect intermittent operation of the lamp, the delayed operation of the second coil biasing the second-mentioned switch bar to open position after said intermittent operation of the lamp, to open the circuit of the first-mentioned heater coil permitting said first-mentioned switch to remain closed for continuous closure of the lamp circuit.

6. A vehicle signal comprising in combination a lamp and circuit therefor, a thermally controlled switch in series with the circuit of said lamp to effect an intermittent operation thereof, said thermally-controlled switch comprising a heat-responsive bar, an electric contact carried by the bar, a fixed contact normally engaged by said first-mentioned contact, said fixed contact being connected to the lamp and a heater coil on the bar connected to the fixed contact of said thermally controlled switch and to the circuit so as to be in series with said heat-responsive bar when the contacts are closed but in shunt to the lamp, a second thermally-controlled switch operative a predetermined time after operation of the first switch has been initiated to open the circuit of the said heater coil to permit said bar and contact to hold the lamp circuit closed continuously, said second switch comprising a heat-responsive contact carrying bar and a fixed contact normally engaged by the contact carried by said bar, said switch being connected in series with the said heater coil and in shunt with said lamp and a heater coil mounted on said bar and connected in shunt to said first mentioned heat responsive bar, said lamp and said coil, the second bar and coil being slower acting than the first bar and coil.

This specification signed this 6th day of January, 1928.

LEON N. HAMPTON.